United States Patent [19]

White

[11] 4,236,339

[45] Dec. 2, 1980

[54] SIGNALING FISHING STAND

[76] Inventor: Lorell White, 5747 S. Honore, Chicago, Ill. 60636

[21] Appl. No.: 20,525

[22] Filed: Mar. 14, 1979

[51] Int. Cl.³ .............................................. A01K 97/12
[52] U.S. Cl. ......................................... 43/17; 43/21.2
[58] Field of Search ...................... 43/17, 21.2, 54.5 R

[56] References Cited

U.S. PATENT DOCUMENTS

| 2,816,388 | 12/1957 | Hartley | 43/17 |
|---|---|---|---|
| 3,134,187 | 5/1964 | Blakely | 43/17 |
| 3,228,135 | 1/1966 | Kricksfeld | 43/17 |
| 3,560,969 | 2/1971 | Fleeman | 43/17 |
| 3,618,068 | 11/1971 | Sloan | 43/17 |
| 3,670,443 | 6/1972 | Federline | 43/17 |
| 3,879,880 | 4/1975 | Bailey | 43/17 |
| 4,112,607 | 9/1978 | Scher | 43/17 |

Primary Examiner—Nicholas P. Godici
Attorney, Agent, or Firm—Gary, Juettner & Pyle

[57] ABSTRACT

A signaling fishing stand holds a conventional fishing pole or rod and provides either an audible or visual signal when a fish strikes. The stand has a pointed support which can be made to engage in the ground or with folding legs to hold up the stand and may also provide a tackle box for holding the fisherman's gear.

6 Claims, 5 Drawing Figures

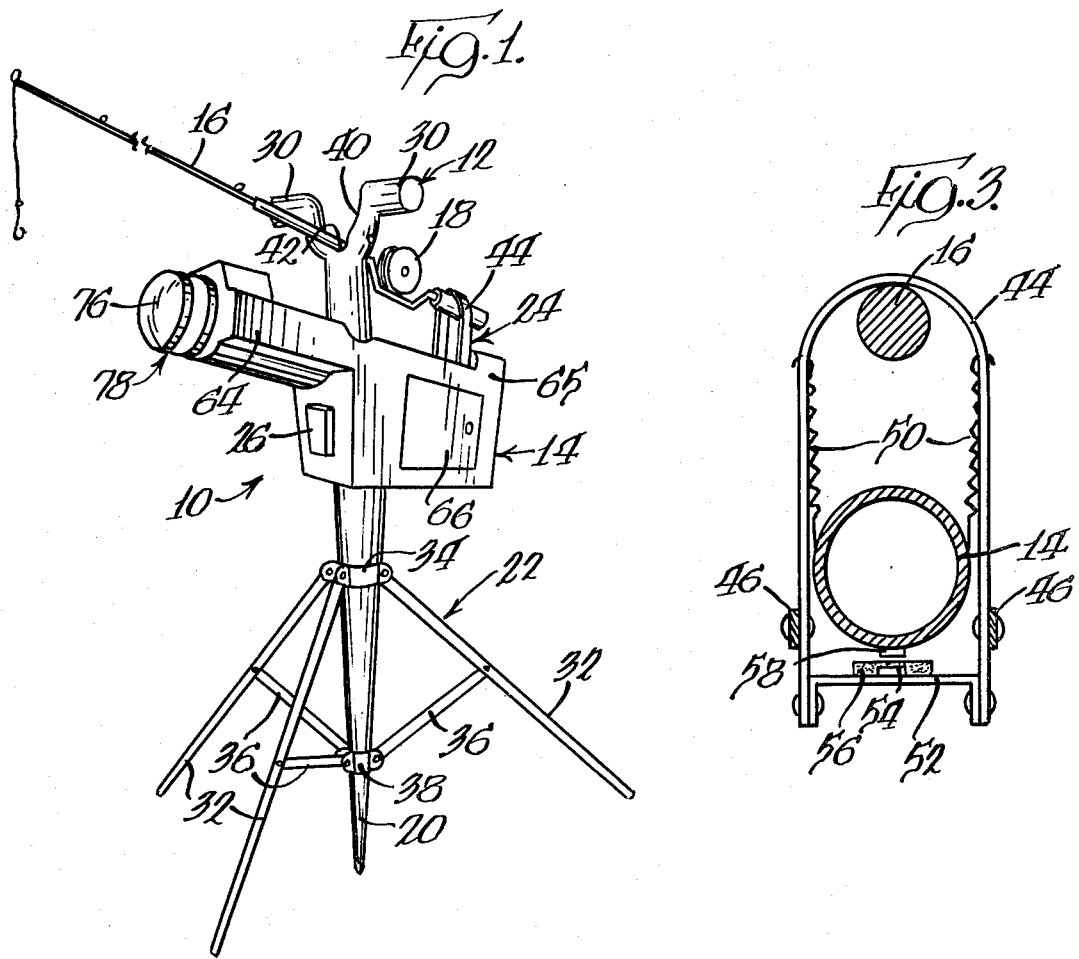
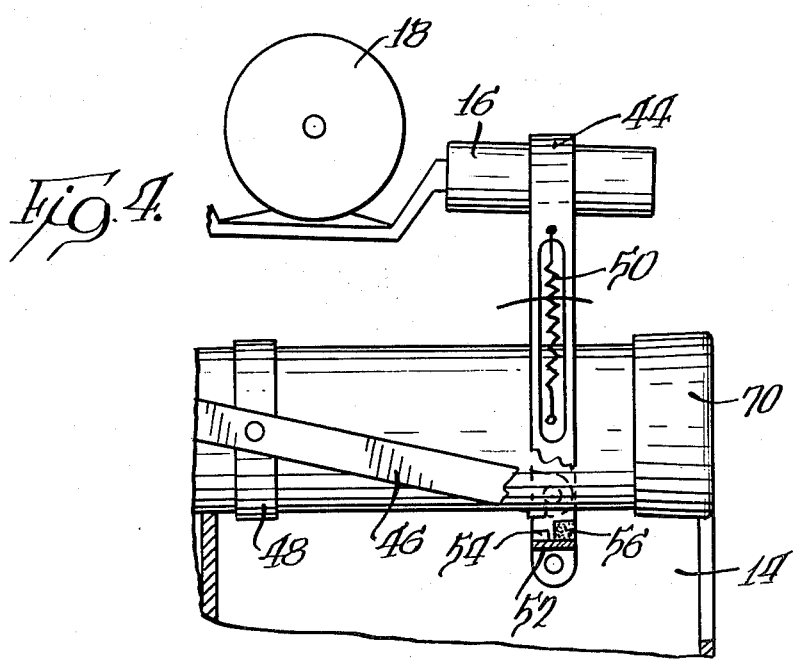

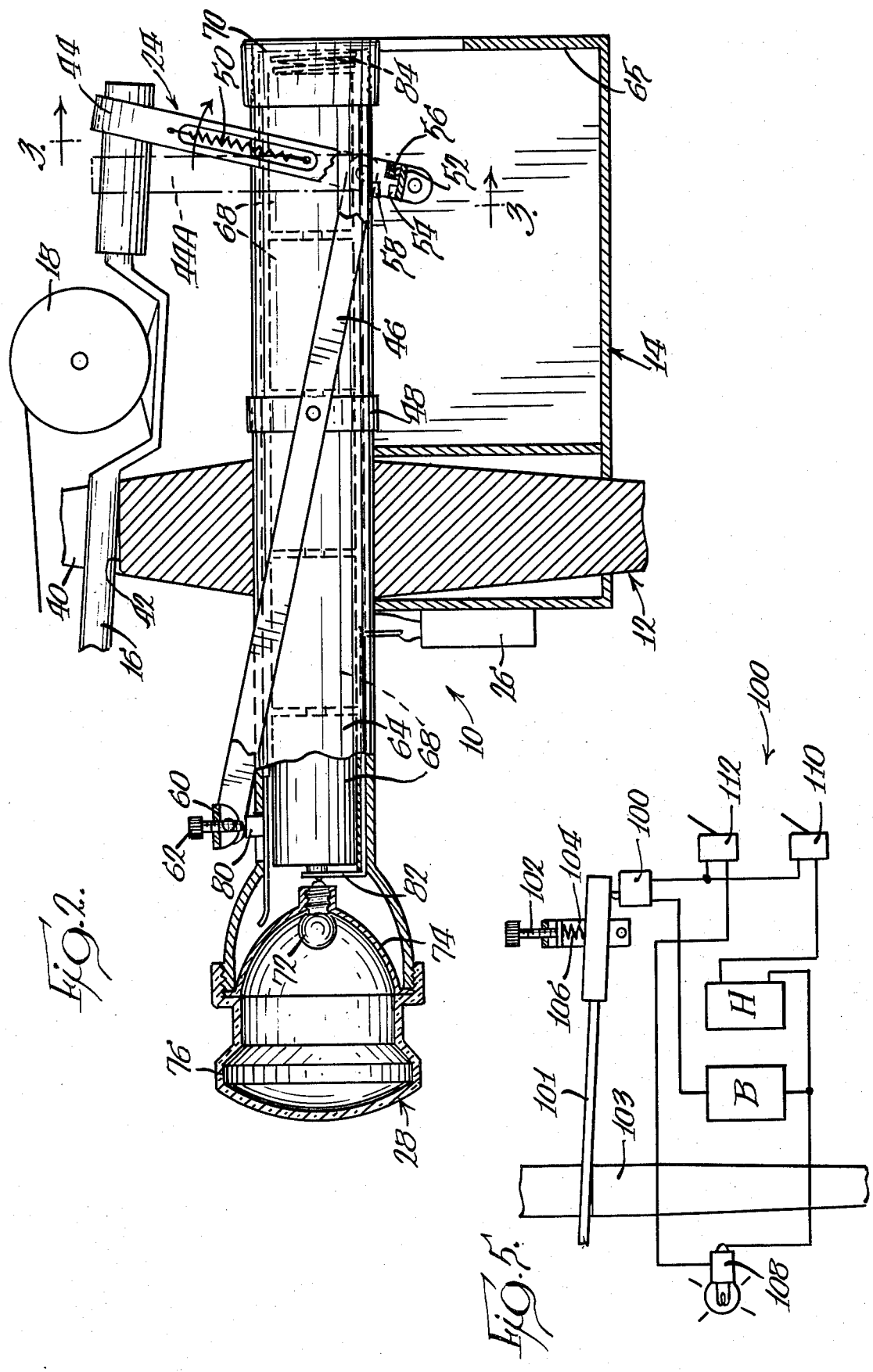

SIGNALING FISHING STAND

This invention relates to a stand which is adopted to hold a convention fishing pole or rod, and more particularly, to a stand which signals when a fish is caught.

SUMMARY OF THE INVENTION

Heretofore, fishermen fishing from the shore usually proped their fishing rod along the shore with rocks or sticks or whatever happened to be convenient, then had to watch the pole to determine when a fish was biting. If the fisherman did not pay close attention to the rod, he might lose a fish which would bite, but then get off the hook. The problem of keeping watch on the fishing rod could be even more difficult if the fisherman deployed more than one rod, for example three, at somewhat different locations. Also, at night, it is nearly impossible to watch the rod in absence of a special light.

SUMMARY OF THE PRESENT INVENTION

The fishing rod stand of the present invention alleviates the problem by providing a means for holding a conventional fishing rod, means for determining when a fish strikes or "hits" the rod and means for signaling the fisherman of such occurance. Preferably, the means for signaling includes means for selecting an audio or visual signal, or both, to better alert the fisherman should he be at some distance away or at night. Further, the fishing stand of the present invention provides means for being mounted on a flat or hard surface, such as a pavement, in the form of foldable legs, or means for being mounted on soft ground or between a crevice in rocks, in the form of a pointed, ground engaging support handle which is adopted to be pushed into the ground, and/or also to engage the above-mentioned foldable legs. For convenience of the fisherman, the stand of the present invention may incorporate a tackle box for other of the fisherman's gear.

It is an object of the present invention to provide a fishing stand for accommodating a conventional fishing pole or rod and capable of signaling or alarming when a fish strikes the rod.

Another object of the present invention is to provide a fishing stand which can give an audio or visual signal of a fish striking.

Yet another object of the present invention is to provide a fishing stand which can be supported on hard ground, soft ground or rock.

These and other objects of the present invention will become apparent from the following written description and accompanying figures of the drawings, wherein:

BRIEF DESCRIPTION OF THE FIGURES IN THE DRAWINGS

FIG. 1 is a perspective view of a fishing stand of the present invention, shown holding a conventional fishing rod;

FIG. 2 is an enlarged cross-sectional of a portion of the fishing stand shown in FIG. 1;

FIG. 3 is a cross-sectional view taken in the direction of the arrows 3—3 on FIG. 2;

FIG. 4 is cross-sectional view of a portion of the fishing stand shown in FIG. 3, but in an alternative position; and FIG. 5 is a schematic diagram of a second embodiment of a fishing stand of the present invention.

DETAILED DESCRIPTION OF THE FISHING STAND OF THE PRESENT INVENTION

Referring to FIG. 1, the first embodiment of the fishing stand 10 of the present invention is shown and comprises a support 12 and a body 14 for carrying or holding a conventional fishing rod 16, in this instance with a reel 18. The support 12 has a pointed end 20 for engaging soft ground or a crevice in rock or cooperates with separate folding legs 22 for holding the stand upright or a hard surface, such as rock or pavement. The fishing stand carries means 24 for detecting a fish striking the rod and means for providing a signal of such event to the fisherman, either audiably as by a horn 26 or visually by a light 28.

As shown, the upper end of the support 12 is bifurcated to provide engaging handles 30 to assist a fisherman in thrusting the pointed end 20 into the ground, if to be used in that manner.

The folding legs 22 includes three folding leg elements 32 pivotally mounted at their upper ends to a upper ring 34 which receives the lower portion of support 12. The midpoints of the legs 32 are pivotally connected to braces 36, which in turn, are pivotally connected to a lower, smaller ring 38, receiving the pointed end 20 of support 12 through its middle. When opened as shown in FIG. 1, the folding legs 22 can support the fishing stand 10 on generally flat ground. When the ground is rocky or soft, the legs 32 may be folded and the folding legs 22 removed, and the pointed end 20 of support 12 driven directly into the ground or between two rocks to support the fishing stand.

As noted in FIG. 1, the upper end of support 12 has a U shaped opening 40 between the handle portions 30, at the lowest portion thereof being a notch 42, adopted to accept a conventional fishing rod. As shown in FIG. 1, the rod 16 is cradled in the notch 42 with its center of gravity between the notch and tip of the rod 16 so that the handle of the rod tends to move upwardly, if not restrained.

Referring now to FIGS. 2 and 3 and the detecting means 24, the handle of the fishing rod is slipped or installed in an inverted U-shaped member 44 which retains the handle of the rod in place. In turn, the U-shaped member 44 is pivotally mounted to a pair of elongated levers 46, one on each side. The levers 46 are, in turn, near their centers pivotally mounted to a circular mounting ring 48 secured to the body 14. Of course, the mounting for levers 46 could be made integral with the body 14. Referring back to the U-shaped member 44, it is biased downward by a pair of springs 50, which at their upper ends are secured to openings in the member 44 and at their lower ends to openings formed in the body 14. Of course, other suitable counterbalancing arrangements could be used.

As shown in FIGS. 2 and 3, the member 44 at its lower end carries a cross-bar 52 on which is mounted an electrical contact 54 and an insulator 56. The bar 52 is secured to the member 44 by conventional means, such as screws or nuts. The contact 54 is adopted to engage a similar contact 58 fixed on the body 14.

At the end of the levers 46 opposite member 44 is another cross member 60 which is mounted to the levers 44 and carries an adjustable screw 62 for purpose which will become hereinafter apparent.

Referring back to FIG. 1, the body 14 has an elongated generally horizontal front portion 64 which extends to a rear portion 65 having a door 66 providing access to storage area, or tackle box, in which the fisherman can store some of his fishing gear. As shown in FIG. 2, the upper part of the body is tubular, similar to a flash light and is adopted to enclose flash light batteries 68. The rear of the tubular portion is closed by a removable cap 70. The front end of the upper portion carries a bulb 72, reflector 74 and translucent globe 76 to increase the visibility of the light when viewed from the side. The body 14 also carries a switch 80, similar to the switch found on a conventional flashlight which can be closed by pushing down on a portion thereof. The screw 62, heretofore described, engages the switch 80 in such a manner that downward movement of the screw a sufficient distance causes the switch 80 to light, but due to the internal physical resistance of the switch, at least some force is needed to cause the switch 80 to close. This portion of the fishing stand is similar to that of a conventional flashlight.

The horn 26 of the stand 10 is electrically connected to the positive terminal 82 of the batteries, as by a metal conductor or wire and to one of the terminals 54 or 58 as by wire. The other of terminals 54 and 58 is connected by a metal conductor or wire to the negative terminal 84 of the batteries.

As will be appreciated, when a fish strikes, with the drag set on the reel 18, it will cause the tip of the pole to want to move downwardly and the handle of the pole to move upward. As this occurs, the inverted U-shaped member 46 is moved upward and the lever 44 pivots downward to cause the screw 62 to move downward and engage and close the switch 80 to cause a light signal to be given signaling the presence of a fish. If the U-shaped member 44 is in the position shown in FIG. 2 in solid lines, the contacts 54 and 58 will also, at some point of upward movement of the member 46, contact and give an audible signal with the horn 26. If desired, the screw 62 can be advanced downward enough so that the light signal is given first.

If the U-shaped member 44 is shifted to the position shown in FIG. 4 and in dashed lines 44A in FIG. 2, the insulator 56 contacts the body 14 first and will prevent the contacts 54 and 58 from contacting so that only a visual or light signal is given, and an audible signal is not given. The movement of the member 44 is limited by the length of the opening (not shown) provided in the upper surface (not shown) of the body 14 adjacent the member 44 to that between the positions shown in FIGS. 2 and 4. Of course, it would be possible to reverse the wiring of the horn and light so that contacts 54 and 58 operate the light, and the switch 80 operates the horn.

As is apparent, the visual light signal or audio signal given by the fishing stand of the present invention when a fish strikes a conventional fishing rod or pole greatly facilitates fishing.

Referring to FIG. 5, an alternative electrical arrangement for the fishing stand is shown. In this arrangement, the switch 80 and contacts 56 and 54 are replaced by a push button switch 100 which has a button internally biased upward and is normally closed, the presence of the fishing rod 101 on the stand causing this button of the switch to move down to open the switch. The rod 101 is supported at its middle by a support 103 (similar to support 12). The force with which the rod is biased downward against the switch 100 can be regulated by a screw 102 adjustably mounted on the U-shaped member 104 (similar to member 46 but fixed to the body of the stand), and carrying a spring 106 on its end. The more the screw is turned down, the greater need be the force applied to the tip of the pole to lift its handle off the switch 100 to close the same. As can be appreciated, the screw 102 can be adjusted to give the desired sensitivity so that the switch 100 closes when a fish strikes. A battery B has one terminal wired to the switch 100, the other terminal of the battery is wired to one terminal of the light 108 and horn H. The other terminal of the light 108 and horn H are carried to one of the terminals of two different single poles, signal throw (S.P.S.T. ) switches 110 and 112, respectively. The other terminals of the switches 110 and 112 are wired in parallel to the other terminal of switch 100. As is apparent, either a visual light or audible signal, or both signals, may be selected by closing (putting it into the on position) only switch 110 or 112, or both 110 and 112, respectively. And, of course, with both switches 110 and 112 open, no signal can be given to prevent accidental drain of the battery.

While only two embodiments of the fishing stand of the present invention have been described and illustrated, it is to be appreciated that the invention is not limited to such embodiments, but comprehends other constructions and arrangements, without departing from the scope of the invention as set forth in the appended claims.

What is claimed is:

1. A fishing stand adapted to hold a conventional fishing rod or pole, comprising means for cradling the fishing pole on the stand, means for detecting the movement of the pole caused by a fish striking the pole and for giving a signal to the fisherman of the fish striking the fishing pole, said means for detecting and signaling comprising an inverted U-shaped member for engaging the handle of said pole, at least one lever pivotally mounted to said stand, a power source, a light, a horn, a light switch and a horn switch, said means for detecting and signaling selectively operating through either one of said light and horn switches, or both, to connect one of said light and horn, or both, to said power source to give a signal, one end of said lever being pivotally mounted to said inverted U-shaped member and the other end of said lever operating one of said light or horn switches, the other of said light and horn switches being operated by said inverted U-shaped member.

2. A fishing stand adapted to hold a conventional fishing rod or pole, comprising an inverted U-shaped member for engaging the handle of said fishing pole, at least one elongated lever pivotally mounted to said stand, one end of said lever being pivotally mounted to the lower portion of said inverted U-shaped member, a power source carried on said stand, a light carried on said stand, a horn carried on said stand, switch means carried on said U-shaped member adjacent said one end of said lever and being adapted to engage with a stationary portion of said stand above said switch means, said switch means being connected in a circuit with said power source and at least one of said light and horn, and an adjustable screw carried on said stand for varying the point at which said switch means switches by varying the relative position between said switch means and said stationary portion of said stand.

3. A fishing stand as in claim 1 or 2, further comprising a support having a lower pointed end for engaging in the ground and an upper end for cradling the fishing rod.

4. A fishing stand as in claim 3, further comprising folding legs which can engage with said support to hold the stand on substantially flat surfaces.

5. A fishing stand as in claim 1 or 2, further including a tackle box portion for storing a fisherman's gear, a support having a lower pointed end for engaging in the ground and an upper end for cradling the fishing rod, and seperate folding legs which can engage with the support to hold the stand on substantially flat ground.

6. A fishing stand as in claim 1, wherein said inverted U-shaped member may be placed in one position wherein only one of said light or horn switches is operated, and said inverted U-shaped member has a second position wherein the other of said light and horn switches is operated.

* * * * *